United States Patent [19]

Shimizu

[11] Patent Number: 4,578,819

[45] Date of Patent: Mar. 25, 1986

[54] SPACE DIVERSITY RECEIVER

[75] Inventor: Yoshio Shimizu, Kanagawa, Japan

[73] Assignee: Sony Corporation, Tokyo, Japan

[21] Appl. No.: 634,033

[22] Filed: Jul. 24, 1984

[30] Foreign Application Priority Data

Jul. 25, 1983 [JP] Japan .................. 58-135583
Aug. 12, 1983 [JP] Japan .................. 58-147720

[51] Int. Cl.⁴ .................. H04B 1/16; H04B 7/02
[52] U.S. Cl. .................. 455/135; 455/277
[58] Field of Search .................. 455/133–136, 455/52, 277; 375/100

[56] References Cited

U.S. PATENT DOCUMENTS 4,403,343 9/1983 Hamada .................. 455/277
4,426,727 1/1984 Hamada .................. 455/135
4,450,585 5/1984 Bell .................. 455/135
4,525,869 6/1985 Hamada et al. .................. 455/277

FOREIGN PATENT DOCUMENTS 7939 1/1983 Japan .................. 455/277

Primary Examiner—Jin F. Ng
Attorney, Agent, or Firm—Lewis H. Eslinger; Alvin Sinderbrand

[57] ABSTRACT

In a space diversity receiver for receiving broadcast signals and having first and second antennas coupled to first and second receiving circuits, respectively, for supplying first and second output signals therefrom to a switching circuit which normally selectively supplies the one of the output signals detected to have a superior or better signal to noise ratio; a judging circuit is provided for comparing the better signal to noise ratio of an output signal with a predetermined value and for producing a stop or inhibiting signal when the signal to noise ratio is lower than the predetermined value, and such inhibiting signal temporarily causes the switching circuit to stop switching between the output signals and to continuously supply one of the output signals.

10 Claims, 25 Drawing Figures

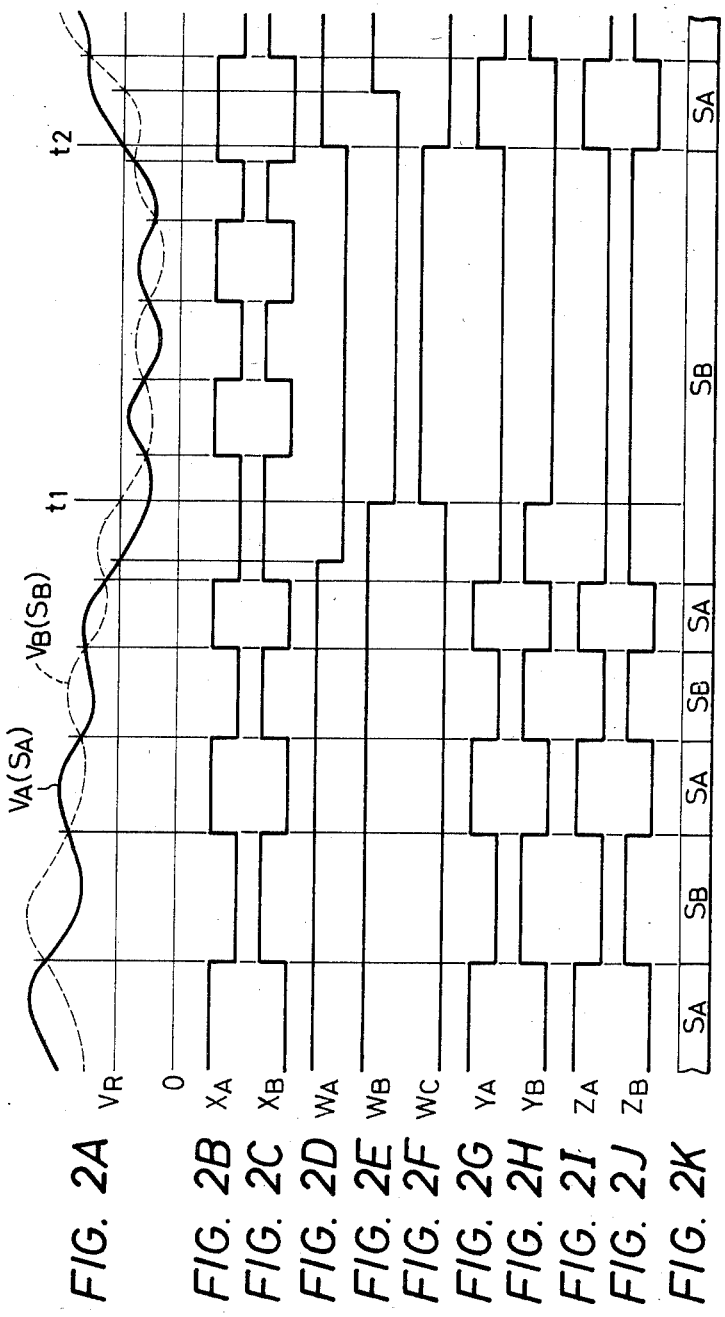

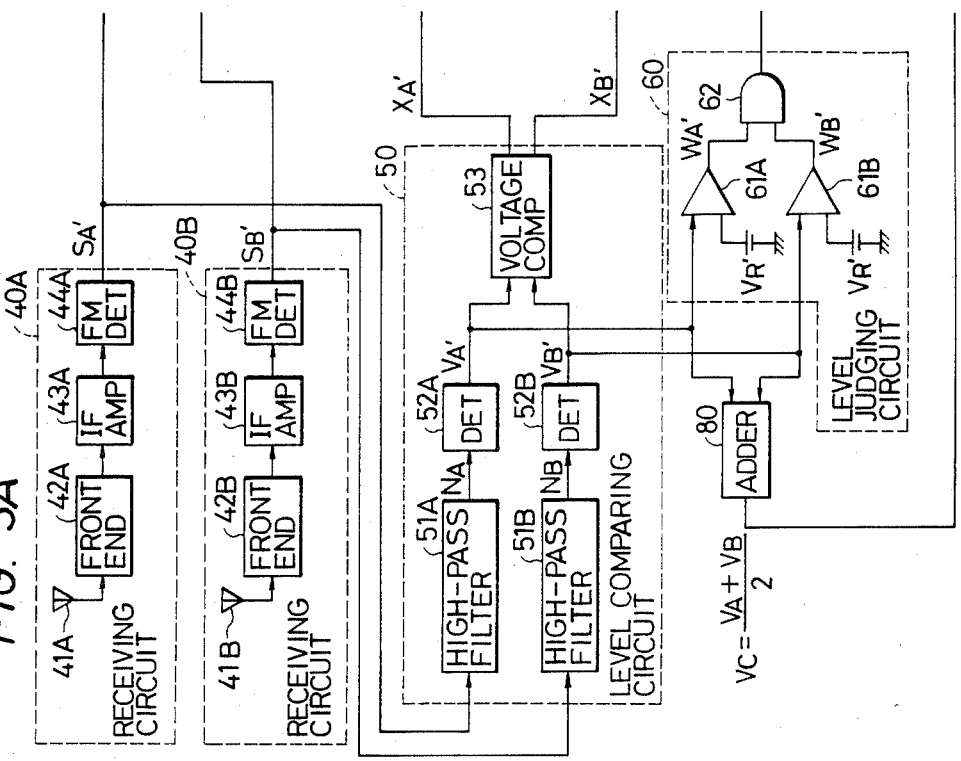

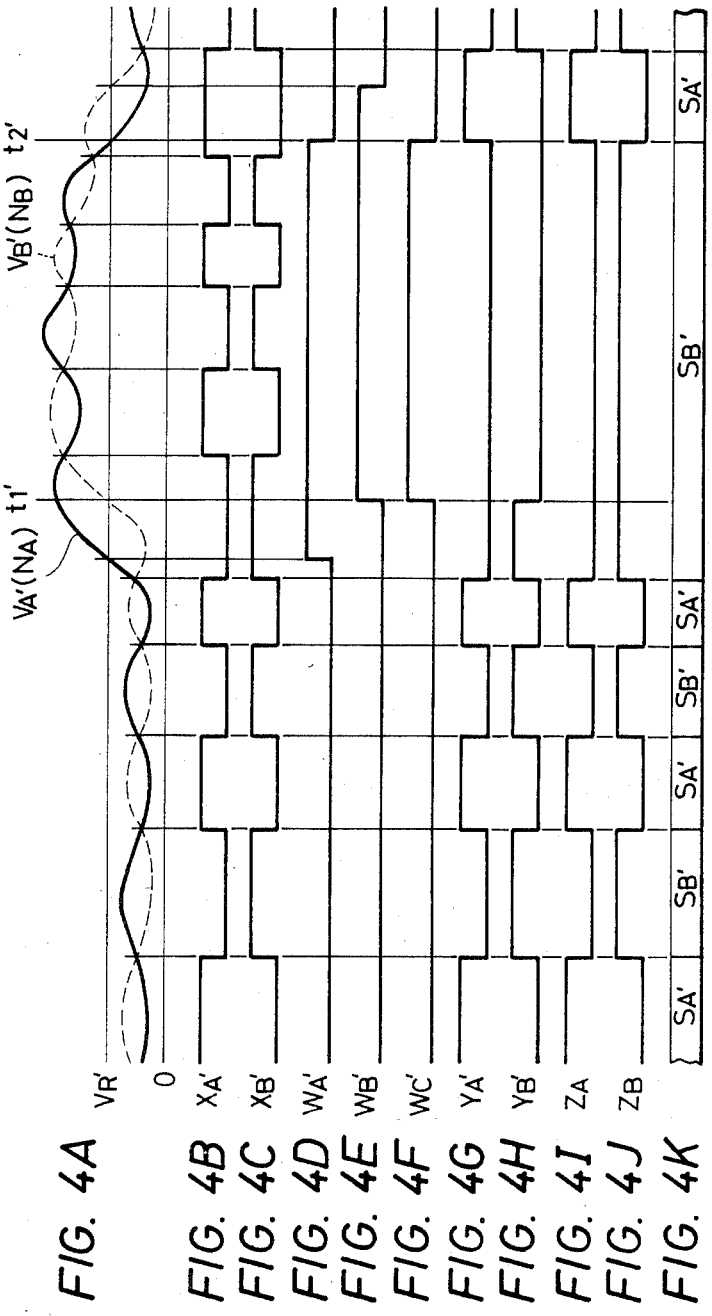

SPACE DIVERSITY RECEIVER

BACKGROUND OF THE INVENTION

1. Field of the Invention

This invention relates to apparatus for receiving broadcast signals, and more particularly, to a space diversity receiver which receives at least two signals and which choses the signal having the best signal to noise ratio to produce an output audio signal therefrom.

2. Description of the Prior Art

Diversity transmission is a form of transmission using several modes, usually in time or in space, to compensate for fading or outages in any one of the modes. In a space diversity system, the same signal is sent simultaneously over several different transmissions paths, which are separated enough so that independent propagation conditions can be expected. In diversity reception, the effects of fading during reception of a radio signal are minimized by combining or selecting two or more sources of a received signal which carry the same intelligence but differ in strength or signal to noise ratio.

A space diversity receiver of known construction for receiving broadcast signals includes a pair of receiving circuit blocks. Each receiving circuit block has associated therewith an antenna for receiving the broadcast signal. The space diversity receiver compares the level of the two received signals, or the noise components contained in the signals, in order to select the signal which has the better signal to noise ratio. The receiver uses the comparison to switch from one signal to the other as the strengths of the two signals change and produces an audio output signal from the stronger signal. However, objectionable pulse noise can be generated from the switching operation and this can be included in the audio output signal. This is especially noticeable when a space diversity receiver is used in an automobile since the location of the receiver changes over a relatively broad area and the intensity of the electric field of the broadcast signal varies quite frequently, so that frequent switching between the receiving circuit blocks occurs. The pulse noise is particularly conspicuous or objectionable when the intensity of the electric field of the broadcast signal is relatively weak. It is to be noted that the signals derived from the receiving circuits in such an instance have an inherently low signal to noise ratio, anyway, and produce a low quality audio output signal even without the addition of the pulse noise.

In order to reduce the pulse noise caused by switching between the signals from the receiving circuits, it has been proposed to supply the audio output signal to a hold circuit which "holds" or repeats the preceding level. Each segment of the audio output signal obtained during switching is replaced with the level of the immediately preceding signal segment so that the pulse noise is eliminated. However, in such a proposal, the high frequency components of the audio output signal are lost along with the pulse noise in the substituted portions of the signal. Accordingly, the quality of the audio output signal suffers significant degradation.

OBJECTS AND SUMMARY OF THE INVENTION

Accordingly, it is an object of the present invention to provide an improved space diversity receiver for receiving broadcast signals which avoids the above-mentioned problems encountered with the prior art.

It is another object of the present invention to provide an improved space diversity receiver for receiving broadcast signals which can reduce the pulse noise which occurs from switching between the signals derived from more than one receiving circuit and which can select the received signal so that an audio output signal having a superior signal to noise ratio is produced.

It is still a further object of the present invention to provide an improved space diversity receiver for receiving broadcast signals in which switching between signals from more than one receiving circuit is temporarily prevented or inhibited when the intensity of the electric field of the broadcast signal is less than a predetermined value, so that an audio output signal derived from the received signal does not have a low signal to noise ratio caused by pulse noise produced by switching between the received signals.

In accordance with an aspect of the present invention, a space diversity receiver for receiving broadcast signals comprises first and second antennas, first and second receiving circuits coupled to the first and second antennas, respectively, for supplying first and second output signals, a switching circuit for receiving the first and second output signals and supplying one of the output signals in response to control signals, a detecting circuit for receiving the first and second output signals and identifying one of the signals having a superior signal to noise ration, a judging circuit for comparing the signal to noise ratio for the output signal identified by the detecting means with a predetermined value and for producing a stop signal when the signal to noise ratio is lower than the predetermined value, a switch control circuit for generating the control signals to select one of the first and second output signals supplied to the switching circuit so as to supply the output signal identified by the detecting circuit in the absence of the stop signal from the judging circuit, and for causing the switching circuit temporarily to stop the switching between the first and second output signals and to supply one of the output signals in response to the stop signal from the judging circuit, and an output circuit for producing an audio output signal in response to the output signal supplied by the switching circuit.

The above, and other objects, features and advantages of the present invention will be apparent from the following detailed description taken in conjunction with the accompanying drawings.

BRIEF DESCRIPTION OF THE DRAWINGS

FIGS. 2A to 2K are waveform diagrams useful for understanding the operation of the embodiment of FIG. 1;

FIGS. 3A and 3B are schematic diagrams illustrating an alternate embodiment of a space diversity receiver according to the present invention; and FIGS. 4A to 4K are waveform diagrams useful for understanding the embodiment of FIG. 3.

DETAILED DESCRIPTION OF CERTAIN PREFERRED EMBODIMENTS

Figure 1:
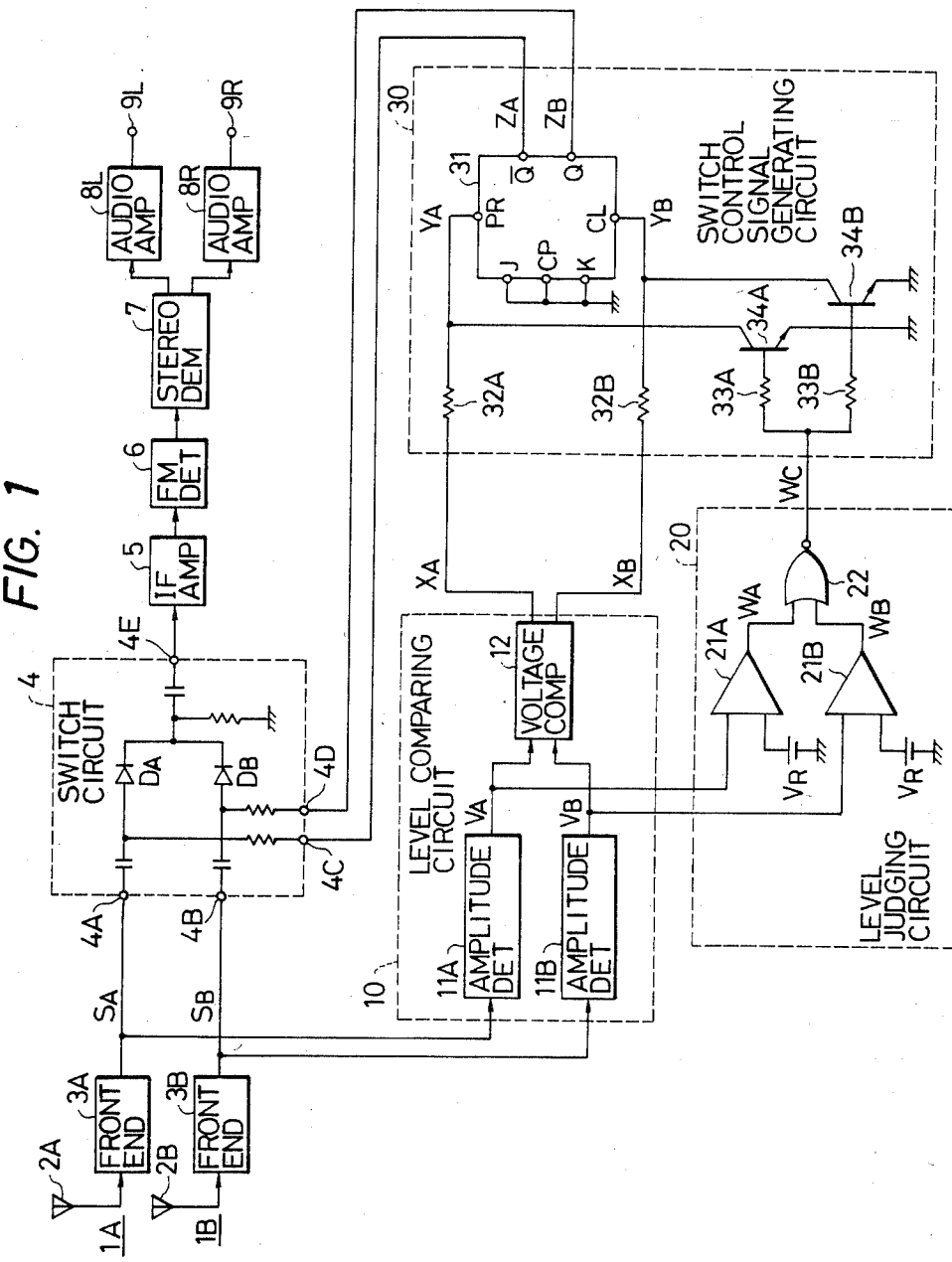
FIG. 1 is a schematic diagram illustrating a space diversity receiver according to an embodiment of the present invention.

Referring to the drawings, and initially to FIG. 1 thereof, an embodiment of a space diversity receiver in accord with the present invention is illustrated for receiving a frequency modulated stereophonic signal (FM stereo signal). The space diversity receiver of FIG. 1 includes a pair of receiving circuit blocks 1A and 1B. Receiving circuit block 1A includes an antenna 2A and a front end circuit 3A. A broadcast FM stereo signal is received by antenna 2A and supplied to front end circuit 3A where it is converted into a frequency-modulated intermediate frequency (FM IF) signal $S_A$. Receiving circuit block 1B includes an antenna 2B and a front end circuit 3B. A broadcast FM stereo signal is received by antenna 2B and supplied to front end circuit 3B to be converted into an FM IF signal $S_B$.

FM IF signals $S_A$ and $S_B$ from receiving circuit blocks 1A, 1B, respectively, are supplied to input terminals 4A, 4B, of a switch circuit 4. Switch circuit 4 supplies one of the FM IF signals $S_A$, $S_B$ to an output terminal 4E in response to switch control signals supplied thereto through control terminals 4C, 4D. The signal from terminal 4E is supplied through an intermediate amplifier 5 to an FM detector 6 to be frequency-demodulated. The output signal from FM detector 6 is supplied to a stereo demodulator 7 where it is separated into left channel and right channel audio output signals. The left and right channel audio output signals are supplied through audio amplifiers 8L, 8R, respectively, and thence, to output terminals 9L and 9R.

The FM IF signals $S_A$ and $S_B$ from receiving circuit blocks 1A, 1B, respectively, are also supplied to a level comparing circuit 10. The levels of FM IF signals $S_A$ and $S_B$ are compared with each other to determine which of the signals $S_A$, $S_B$ has the larger level. More specifically, FM IF signals $S_A$ and $S_B$ are supplied to amplitude detecting circuits 11A, 11B, respectively, to be amplitude detected. Amplitude detecting circuits 11A, 11B produce detected output voltages $V_A$, $V_B$, as illustrated in FIG. 2A. Detected output voltages $V_A$ and $V_B$ are supplied to a voltage comparator 12 to produce a pair of signals $X_A$, $X_B$ supplied at the output terminals of voltage comparator 12. When the level of FM IF signal $S_A$ is larger than the level of FM IF signal $S_B$, and therefore, detected output voltage $V_A$ is greater than detected output voltage $V_B$, signal $X_A$ assumes a high level, and signal $X_B$ assumes a low level, as illustrated in FIGS. 2B and 2C. When the level of FM IF signal $S_A$ is lower than the level of FM IF signal $S_B$, and therefore, detected output voltage $V_A$ is lower than detected output voltage $V_B$, signal $X_A$ assumes a low level and signal $X_B$ assumes a high level, also illustrated in FIGS. 2B and 2C.

A level judging circuit 20 is also included in the space diversity receiver of FIG. 1 for judging whether at least one of the levels of FM IF signals $S_A$, $S_B$ from receiving circuit blocks 1A, 1B is equal to or more than a predetermined level, corresponding to a lower limit of a signal to noise ratio, or whether each of the levels of FM IF signals $S_A$ and $S_B$ is smaller than the predetermined level.

In the illustrated embodiment, the signals $X_A$ and $X_B$ from level comparing circuit 10 are not supplied directly to control terminals 4C, 4D of switch circuit 4 as switch control signals, but rather, are supplied to a special switch control signal generating circuit 30. Switch control signal generating circuit 30 generates switch control signals $Z_A$ and $Z_B$ which are supplied to control terminals 4C, 4D of switch circuit 4 in response to an output signal $W_C$ from level judging circuit 20 and the signals $X_A$ and $X_B$, as described more fully hereinbelow.

Detected output voltages $V_A$ and $V_B$ from detectors 11A and 11B in level comparing circuit 10 are supplied to voltage comparators 21A and 21B, respectively, and compared with a reference voltage $V_R$ in level judging circuit 20. Voltage comparators 21A and 21B generate comparison signals $W_A$ and $W_B$ in response to the comparisons, as illustrated in FIGS. 2D and 2E. Comparison signals $W_A$ and $W_B$ are supplied to a NOR gate circuit 22. At least one of comparison signals $W_A$ and $W_B$ from voltage comparators 21A and 21B assumes a high level, and therefore, the output signal $W_C$ from NOR gate circuit 22 assumes a low level, as illustrated in FIG. 2F, when the level of at least one of FM IF signals $S_A$ and $S_B$ from receiving circuit blocks 1A and 1B is greater than or equal to a predetermined level such that at least one of detected output voltages $V_A$ and $V_B$ obtained from amplitude detecting circuits 11A, 11B is greater than or equal to the reference voltage $V_R$. On the other hand, both signals $W_A$ and $W_B$ assume a low level, and therefore, output signal $W_C$ from NOR gate circuit 22 assumes a high level, as illustrated in FIG. 2F, when the levels of FM IF signals $S_A$ and $S_B$ from receiving circuit blocks 1A and 1B are smaller than the predetermined level such that both detected output voltages $V_A$ and $V_B$ from amplitude detecting circuits 11A and 11B are lower than reference voltage $V_R$. In the illustrated embodiment, output signal $W_C$ operates as a stop or inhibit signal for switch circuit 4, as explained more fully hereinbelow, when it assumes a high level.

Switch control signal generating circuit 30 includes a J-K flip-flop circuit 31 with a preset terminal PR connected through a resistor 32A to the output terminal of voltage comparator 12 from which signal $X_A$ is derived, and also connected to a collector of a transistor 34A. A clear terminal CL of flip-flop circuit 31 is connected through a resistor 32B to the output terminal of voltage comparator 12 from which signal $X_B$ is derived, and also connected to the collector of a transistor 34B. The base of transistor 34A is connected through a resistor 33A to the output terminal of NOR circuit 22, and the emitter of transistor 34A is grounded. The base of transistor 34B is connected through a resistor 33B to the output terminal of NOR gate circuit 22, and the emitter of transistor 34B is grounded. A terminal J, a clock terminal CP and a terminal K of flip-flop circuit 31 are grounded. Switch control signals $Z_A$ and $Z_B$ are derived at terminals $\overline{Q}$ and Q, respectively, of flip-flop circuit 31 which are connected to control terminals 4C and 4D of switch circuit 4, respectively.

The embodiment of FIG. 1 operates as follows:

When at least one of the received signals is relatively strong, meaning that at least one of the levels of FM IF signals $S_A$ and $S_B$ from receiving circuits 1A, 1B, respectively, is equal to or more than a predetermined level, switch circuit 4 supplies to IF amplifier 5 the signal $S_A$ or $S_B$ having the highest level. More particularly, the broadcast signals are received by antennas 1A, 1B and converted to FM IF signals $S_A$ and $S_B$ which are supplied to amplitude detectors 11A, 11B to produce detected output voltages $V_A$ and $V_B$, respectively. When at least one of the levels of FM IF signals $S_A$, $S_B$ is equal to or more than a predetermined level, i.e., when either detected output voltage $V_A$ or $V_B$ (or both) exceeds predetermined level $V_R$, output signal $W_C$ from level judging circuit 20 assumes a low level, so that transistors 34A and 34B are nonconductive. Detected output signals $V_A$ and $V_B$ are supplied to voltage comparator 12 which generates signals $X_A$ and $X_B$ to be supplied directly to preset terminal PR and clear terminal CL of flip-flop circuit 31, respectively. (It is to be noted that signals $Y_A$ and $Y_B$ (FIGS. 2G and 2H) at preset terminal PR and clear terminal CL, respectively, are the same as signals $X_A$ and $X_B$ (FIGS. 2B and 2C) from level comparing circuit 10 so long as stop signal $W_C$ is at a low level (FIG. 2F). Accordingly, switch control signals $Z_A$ and $Z_B$ from the $\overline{Q}$ and Q terminals of flip-flop circuit 31 then coincide with signals $Y_A$ and $Y_B$ supplied to preset terminal PR and clear terminal CL, as shown in FIGS. 2I and 2J, respectively. Stated another way, switch control signals $Z_A$ and $Z_B$ correspond to signals $X_A$ and $X_B$ from level comparing circuit 10 so long as signal $W_C$ is at a low level.

Consequently, as illustrated in FIG. 2K in the period before time $t_1$ and the period after time $t_2$ during which periods signal $W_C$ is low, a diode $D_A$ in switch circuit 4 is made conductive and a diode $D_B$ is made nonconductive so that FM IF signal $S_A$ is supplied to output terminal 4E during each interval when the level of FM IF signal $S_A$ is larger than the level of FM IF signal $S_B$. On the other hand, during each interval when the level of FM IF signal $S_B$ is larger than the level of FM IF signal $S_A$, diode $D_A$ is made nonconductive and diode $D_B$ is made conductive so that FM IF signal $S_B$ is supplied to output terminal 4E. As described hereinbefore, the FM IF signal $S_A$ or $S_B$ which has the larger level is selected to be supplied from switch circuit 4. It is to be appreciated that the output signal from switch circuit 4 is used to derive the left and right channel audio output signals supplied at output terminals 9L, 9R.

It can occur, of course, that both received signals are of a low quality, i.e., both are below the predetermined level. When the levels of each FM IF signals $S_A$ and $S_B$ from receiving circuits 1A and 1B, respectively, are smaller than the predetermined level, the FM IF signal $S_A$ or $S_B$ previously selected is supplied at terminal 4E and used to derive the left and right channel audio output signals. More particularly, when the levels of both FM IF signals $S_A$, $S_B$ are low, detected output voltages $V_A$ and $V_B$ from amplitude detectors 11A and 11B are less than reference voltage $V_R$, as determined by comparators 21A and 21B. Output signal $W_C$ of level judging circuit 20 then assumes a high level to function as a stop or inhibit signal. When output signal $W_C$ of high level is supplied to the base electrodes of transistors 34A and 34B, such transistors are made conductive and preset terminal PR and clear terminal CL of flip-flop 31 are grounded. Consequently, as illustrated in FIGS. 2I and 2J, in the period between times $t_1$ and $t_2$, switch control signals $Z_A$ and $Z_B$ from the terminals $\overline{Q}$ and Q of flip-flop circuit 31 remain in the states or configurations immediately preceding time $t_1$, that is, the time at which the levels of FM IF signals $S_A$ and $S_B$ become smaller than the predetermined level. Switch control signal $Z_A$ assumes a low level and switch control signal $Z_B$ assumes a high level, regardless of the relationship between the levels of FM IF signals $S_A$ and $S_B$. As a result, switch circuit 4 no longer switches between FM IF signals $S_A$ and $S_B$, and continues supplying the signal selected immediately before time $t_1$. It is to be appreciated that, in the illustrated example, in the period prior to time $t_1$, diode $D_A$ is nonconductive, and diode $D_B$ is conductive, so that FM IF signal $S_B$ is supplied to output terminal 4E of switch circuit 4, as illustrated in FIG. 2K, in the period between time $t_1$ and time $t_2$. Thus, in the period in which signals $S_A$ and $S_B$ are smaller than the predetermined level, one of FM IF signals $S_A$ and $S_B$ is continuously supplied from switch circuit 4 and used to derive the left and right channel audio signals therefrom.

In the embodiment of FIG. 1, so long as the levels of both FM IF signals $S_A$ and $S_B$ remain smaller than the predetermined level, switch circuit 4 continues to supply, as its output signal, the signal $S_A$ or $S_B$ which it was supplying immediately before the time at which both signals $S_A$ and $S_B$ became smaller than the predetermined level. Alternatively, a space diversity receiver in accordance with the present invention can be constructed so that switch control signals $Z_A$ and $Z_B$ always assume predetermined states or configurations in which, for example, switch control signal $Z_A$ assumes a high level and switch control signal $Z_B$ assumes a low level, whenever signals $S_A$ and $S_B$ are both below the predetermined level. Thus, in such example, switch circuit 4 continues to supply FM IF signal $S_A$ is supplied to output terminal 4E during the time in which the levels of both FM IF signals $S_A$ and $S_B$ are smaller than the predetermined level. (It is to be appreciated that in such an arrangement, diode $D_A$ is conductive, and diode $D_B$ is nonconductive.)

It is to be still further appreciated that, the special switch control signal generating circuit 30 included in the embodiment of FIG. 1 may be omitted, and the signals $X_A$ and $X_B$ from level comparing circuit 10 could be supplied directly to control terminals 4C and 4D of switch circuit 4, respectively, in which case voltage comparator 12 included in level comparing circuit 10 would be controlled by output signal $W_C$ from level judging circuit 20. In such an instance, when at least one of of FM IF signals $S_A$ and $S_B$ has its level equal to or larger than a predetermined level, detected output voltages $V_A$ and $V_B$ from amplitude detecting circuits 11A and 11B are compared with each other in voltage comparator 12 in response to a low level of output signal $W_C$. The resulting signals $X_A$ and $X_B$ from voltage comparator 12 indicate which one of FM IF signals $S_A$ and $S_B$ has the larger level. When the levels of both FM IF signals $S_A$ and $S_B$ are both smaller than the predetermined level, the resulting high level of signal $W_C$ inhibits or stops voltage comparator 12 from performing a voltage comparison. It is to be appreciated that output signal $W_C$ in such an instance would act as a stop signal to stop switch circuit 4 from switching from one to the other of signals $S_A$ and $S_B$. Signals $X_A$ and $X_B$ from voltage comparator 12 maintain a predetermined configuration in which, for example, signal $X_A$ assumes a high level and signal $X_B$ assumes a low level, regardless of the relationship between detected output voltages $V_A$ and $V_B$ from amplitude detecting circuits 11A and 11B.

Figure 3B:
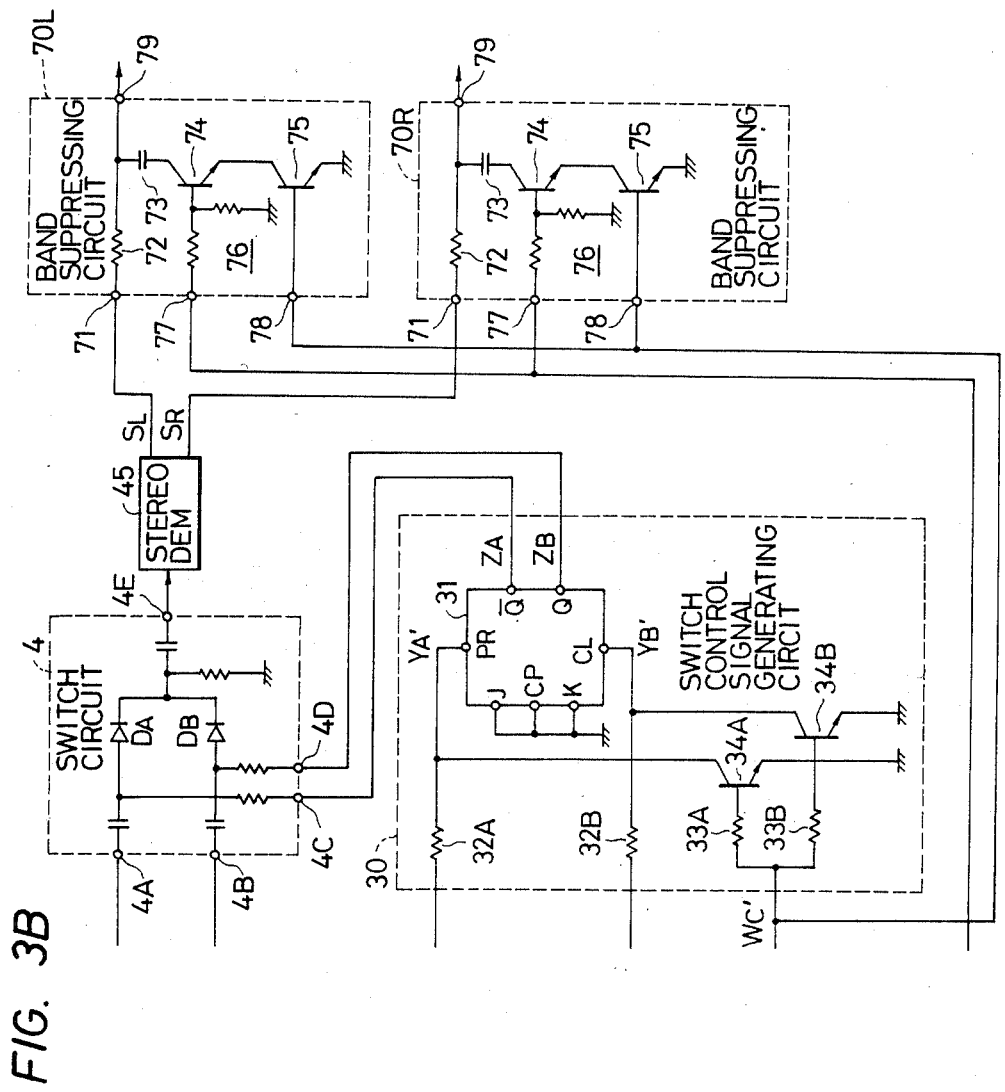

FIG. 3 illustrates an another embodiment of a space diversity receiver in accord with the present invention which also receives an FM stereo signal and includes a pair of receiving circuits 40A and 40B. Receiving circuit 40A includes an antenna 41A, a front end circuit 42A for converting a broadcast FM stereo signal received by antenna 41A into an FM IF signal, an intermediate amplifier 43A for amplifying the FM IF signal from front end circuit 42A, and an FM detector 44A for frequency-demodulating the FM IF signal from intermediate amplifier 43A to produce a demodulated signal $S_A'$. Similarly, receiving circuit 40B includes an antenna 41B, a front end circuit 42B, an intermediate amplifier 43B, and an FM detector 44B, and generates a demodulated signal $S_B'$.

Demodulated signals $S_A'$ and $S_B'$ from receiving circuits 40A and 40B, respectively, are supplied to input terminals 4A and 4B of switch circuit 4. One of demodulated signals $S_A'$ and $S_B'$ is selectively supplied by switch circuit 4 to an output terminal 4E thereof in response to switch control signals supplied to control terminals 4C and 4D, as described more fully hereinbelow. The demodulated signal from terminal 4E is supplied to a stereo demodulator 45 where it is separated into left and right channel audio output signals $S_L$ and $S_R$.

Demodulated signals $S_A'$ and $S_B'$ from receiving circuits 40A and 40B, respectively, are also supplied to a level comparing circuit 50. The levels of the noise components included in demodulated signals $S_A'$ and $S_B'$ are compared to identify which one of demodulated signals $S_A'$ and $S_B'$ contains the lowest noise level, that is, level comparing circuit 50 determines which one of demodulated signals $S_A'$ and $S_B'$ has the better signal to noise ratio. More specifically, demodulated signals $S_A'$ and $S_B'$ are supplied to high-pass filters 51A and 51B, respectively, in which noise components $N_A$ and $N_B$ having frequencies higher than a predetermined frequency, for example, 60 KHz, are extracted from demodulated signals $S_A'$ and $S_B'$. Noise components $N_A$ and $N_B$ are supplied to detecting circuits 52A and 52B, respectively, to produce detected output voltages $V_A'$ and $V_B'$, as illustrated in FIG. 4A.

Detected output voltages $V_A'$ and $V_B'$ are supplied to a voltage comparator 53 and compared therein to produce a pair of signals $X_A'$ and $X_B'$ indicating which signal has the better signal to noise ratio. When the level of noise component $N_A$ contained in demodulated signal $S_A'$ is smaller then the level of noise component $N_B$ in demodulated signal $S_B'$, and therefore, detected output voltage $V_A'$ is lower than detected output voltage $V_B'$ (meaning that the signal to noise ratio of demodulated signal $S_A'$ is superior to the signal to noise ratio of demodulated signal $S_B'$), signal $X_A'$ assumes a high level and signal $X_B'$ assumes a low level, as illustrated in FIGS. 4B and 4C. When the level of noise component $N_B$ in demodulated signal $S_B'$ is smaller than the level of noise component $N_A$ in demodulated signal $S_A'$, and therefore, detected output voltage $V_B'$ is lower than detected output voltage $V_A'$ (meaning that the signal to noise ratio of demodulated signal $S_B'$ is superior to the signal to noise ratio of demodulated signal $S_A'$), signal $X_A'$ assumes a low level and signal $X_B'$ assumes a high level, as illustrated in FIGS. 4B and 4C.

The embodiment of FIG. 3 further includes a level judging circuit 60 for judging whether at least one of the levels of noise components $N_A$ and $N_B$ included in demodulated signals $S_A'$ and $S_B'$ from receiving circuits 40A and 40B, respectively, is smaller than a predetermined level corresponding to a lower limit of a signal to noise ratio. In other words, level judging circuit 60 judges whether the levels of both noise components $N_A$ and $N_B$ included in demodulated signals $S_A'$ and $S_B'$, respectively, are greater than or equal to the predetermined level. It is to be appreciated that, in the embodiment of FIG. 3, signals $X_A'$ and $X_B'$ from level comparing circuit 50 are not supplied directly to control terminals 4C and 4D of switch circuit 4 as switch control signals, but rather, are supplied to a switch control signal generating circuit 30 similar to that described with reference to FIG. 1 and which generates switch control signals $Z_A$ and $Z_B$ supplied to control terminals 4C and 4D of switch circuit 4. An output signal $W_C'$ from level judging circuit 60 controls switch control signal generating circuit 30, as described more fully below.

Detected output voltages $V_A'$ and $V_B'$ from detecting circuits 52A and 52B of level comparing circuit 50 are supplied to voltage comparators 61A and 61B, respectively, in level judging circuit 60 and there compared with a reference voltage $V_R'$ to generate signals $W_A'$ and $W_B'$, respectively (FIGS. 4D and 4D). Signals $W_A'$ and $W_B'$ from voltage comparators 61A and 61B, are supplied to an AND gate circuit 62. Accordingly, at least one of signals $W_A'$ and $W_B'$ assumes a low level, and therefore, output signal $W_C'$ from AND gate circuit 62 assumes a low level, as illustrated in FIG. 4F, when at least one of the levels of noise components $N_A$ and $N_B$ included in demodulated signals $S_A'$ and $S_B'$ is smaller than the predetermined level, and at least one of the detected output voltages $V_A'$ and $V_B'$ is lower than reference voltage $V_R'$. On the other hand, each of signals $W_A'$ and $W_B'$ assumes a high level, and therefore, output signal $W_C'$ from AND gate circuit 62 assumes a high level, as illustrated in FIG. 4F, when both levels of noise components $N_A$ and $N_B$ included in demodulated signals $S_A'$ and $S_B'$ are greater than or equal to a predetermined level, and both detected output voltages $V_A'$ and $V_B'$ from detecting circuits 52A and 52B are greater than or equal to reference voltage $V_R'$. In the illustrated embodiment, output signal $W_C'$ operates as a stop signal when it assumes a high level to prevent switching of signals $S_A'$ and $S_B'$ by switch circuit 4.

Switch control signal generating circuit 30 has the preset terminal PR of its J-K flip-flop circuit 31 PR connected through resistor 32A to the output terminal of voltage comparator 53 from which signal $X_A'$ is derived and to the collector of transistor 34A. Clear terminal CL of flip-flop circuit 31 is connected through resistor 32B to the output terminal of voltage comparator 53 from which signal $X_B'$ is derived and to the collector of transistor 34B. The base of transistor 34A is connected through resistor 33A to the output terminal of AND gate circuit 62. The emitters of transistors 34A and 34B are grounded. The base of transistor 34B is connected through resistor 33B to the output terminal of AND gate circuit 62. The other terminals of J-K flip-flop circuit 31 are connected as in FIG. 1, and a description thereof will not be repeated here for the sake of brevity.

The embodiment of FIG. 3 operates as follows:

Receiving circuits 40A and 40B produce demodulated signals $S_A'$ and $S_B'$ which are supplied to switch circuit 4 and to level comparing circuit 50 to produce detected output voltages $V_A'$ and $V_B'$ and signals $X_A'$ and $X_B'$. Detected output voltages $V_A'$ and $V_B'$ are supplied to level judging circuit 60 where they are compared with reference voltage $V_R'$ to produce output signal $W_C'$. When the level of the noise component $N_A$ and $N_B$ contained in at least one of the demodulated signals $S_{A'}$ and $S_{B'}$ is smaller than the predetermined level, output signal $W_C'$ from level judging circuit 60 assumes a low level, so that transistors 34A and 34B are made nonconductive. Accordingly, signals $X_A'$ and $X_B'$ from level comparing circuit 50 are essentially supplied directly to preset terminal PR and clear terminal CL of flip-flop circuit 31, respectively. In other words, signals $Y_A'$ and $Y_B'$ at preset terminal PR and clear terminal CL are the same as signals $X_A'$ and $X_B'$ from level comparing circuit 50, as illustrated in FIGS. 4G and 4H. Switch control signals $Z_A$ and $Z_B$ from the $\overline{Q}$ and Q terminals of flip-flop circuit 31 coincide with signals $Y_A'$ and $Y_B'$ supplied to preset terminal PR and clear terminal CL, as illustrated in FIGS. 4I and 4J, respectively, and therefore, switch control signals $Z_A$ and $Z_B$ are essentially the same as signals $X_A'$ and $X_B'$ from level comparing circuit 50.

Consequently, as illustrated in FIGS. 4A and 4K, in the period before time $t_1'$ and after time $t_2'$, diode $D_A$ in switch circuit 4 is made conductive and diode $D_B$ is made nonconductive, so that demodulated signal $S_A'$ is supplied to output terminal 4E of switch circuit 4, when the level of noise component $N_A$ contained in demodulated signal $S_A'$ is smaller than the level of noise component $N_B$ contained in demodulated signal $S_B'$. Conversely, when the level of noise component $N_B$ in demodulated signal $S_B'$ is smaller than the level of noise component $N_A$ in demodulated signal $S_A'$, diode $D_A$ is made nonconductive and diode $D_B$ is made conductive so that demodulated signal $S_B'$ is supplied to output terminal 4E. Therefore, the demodulated signal $S_A'$ or $S_B'$ which contains the lowest level noise component is selected to produce the left channel and right channel audio output signals.

When both broadcast signals become noisy, that is, when the noise components in both demodulated signals $S_A'$ and $S_B'$ become greater than or equal to a predetermined level, the demodulated signal $S_A'$ or $S_B'$ which was previously supplied from switch circuit 4 continues to be supplied therefrom, and no switching occurs. More specifically, when the level of both noise components $N_A$ and $N_B$ in demodulated signals $S_A'$ and $S_B'$ is greater than or equal to a predetermined level, output signal $W_C'$ of level judging circuit 60 assumes a high level to operate as a stop signal for switch circuit 4. In particular, transistors 34A and 34B are made conductive, so that preset terminal PR and clear terminal CL of flip-flop circuit 31 are grounded. Consequently, as illustrated in FIGS. 4I and 4J in the period between times $t_1'$ and $t_2'$, switch control signals $Z_A$ and $Z_B$ applied from the terminals $\overline{Q}$ and Q of flip-flop circuit 31 remain in the state or condition in which they were prior to the time $t_1$, that is, prior to the time when the levels of both noise components $N_A$ and $N_B$ became greater than or equal to the predetermined level. In the illustrated case, at the time $t_1'$, and thereafter until the time $t_2'$, switch control signal $Z_A$ assumes a low level and switch control signal $Z_B$ assumes a high level, as at the time immediately prior to the time $t_1'$, regardless of the relationship thereafter between the levels of noise components $N_A$ and $N_B$. As a result, switch circuit 4 no longer switches between demodulated signals $S_A'$ and $S_B'$ and continues the states or configurations which existed immediately prior to time $t_1'$. In this example, diode $D_A$ is non-conductive and diode $D_B$ is conductive, so that demodulated signal $S_B'$ is supplied to output terminal 4E of switch circuit 4, as illustrated in FIG. 4K in the period between time $t_1'$ and time $t_2'$. Thus, one of the demodulated signals $S_A'$ and $S_B'$ is supplied continuously without switching therebetween, and such signal is used to derive the left and right channel audio output signals. It is to be appreciated that the present invention avoids objectionable pulse noise caused by the operation of switch circuit 4 when the levels of noise in both received signals exceeds a predetermined level.

Further, in the embodiment of FIG. 3, when the levels of both noise components $N_A$ and $N_B$ included in demodulated signals $S_A'$ and $S_B'$ are greater than or equal to the predetermined level, left and right channel audio output signals $S_L$ and $S_R$ from stereo demodulator 45 are not supplied directly to the output terminals without modification, but rather are supplied to the output terminals through band suppressing circuits 70L and 70R in which the noise components are suppressed in response to output signal $W_C'$ and detected voltages $V_A'$ and $V_B'$.

In the illustrated embodiment, band suppressing circuits 70L and 70R have the same configuration, and each includes an input terminal 71 receiving the audio output signal $S_L$ or $S_R$ and a series connection of a resistor 72 and a capacitor 73. The collector-emitter path of a transistor 74 and the collector-emitter path of a transistor 75 are connected in series between each input terminal 71 and ground. The base of each transistor 74 is connected to a respective control terminal 77. The base of each transistor 75 is connected through a voltage-divider 76 to a second control terminal 78. An output terminal 79 for the suppressing circuit 70L or 70R is coupled at a connecting point between the respective resistor 72 and capacitor 73.

The generation of control signals for band suppressing circuits 70L and 70R is next to be described. An adding circuit or adder 80 receives detected output voltages $V_A'$ and $V_B'$ from detecting circuits 52A and 52B, respectively, and produces an average voltage $V_C$ as follows:

$$V_C = \tfrac{1}{2}(V_A' + V_B')$$

Adder 80 supplies the average voltage $V_C$ to control terminal 77 of each of band suppressing circuits 70L and 70R. Second control terminals 78 of band suppressing circuits 70L and 70R are connected to the output terminal of level judging circuit 60 and receive output signal $W_C'$ therefrom.

As earlier noted, when at least one of the levels of the noise components $N_A$ and $N_B$ in demodulated signals $S_A'$ and $S_B'$ is smaller than the predetermined level, output level $W_C'$ assumes a low level, and transistors 75 in band suppressing circuits 70L and 70R are turned OFF. Accordingly, left and right channel audio output signals $S_L$ and $S_R$ from stereo demodulator 45 are transferred through resistors 72 to output terminals 79 without any change in the frequency thereof. When the levels of noise components $N_A$ and $N_B$ in both demodulated signals $S_A'$ and $S_B'$ are greater than or equal to the predetermined level, output signal $W_C'$ assumes a high level. Transistors 75 are thus turned ON by signal $W_C'$ and transistors 74 are turned ON by average voltage $V_C$ from adder 80 so that band suppression circuits 70L and 70R operate as low pass filters. Accordingly, left and right channel audio output signals $S_L$ and $S_R$ are transferred through band suppressing circuits 70L and 70R to output terminal 79, respectively, with the high frequency band portions, that is, the portion where noise components $N_A$ and $N_B$ are located, being suppressed. In the embodiment illustrated in FIG. 3, it is desirable that the higher the average voltage $V_C$ supplied from adder 80, the lower the cutoff frequency of the low-pass filters constituted by band suppressing circuits 70L and 70R.

In the embodiment of FIG. 3, switch circuit 4 continues to supply the demodulated signal $S_A'$ or $S_B'$ which was being supplied at the time when the levels of both noise components $N_A$ and $N_B$ become greater than or equal to a predetermined level. However, a space diversity receiver similar to that of FIG. 3 can be provided in accordance with the present invention to cause switch control signals $Z_A$ and $Z_B$ to assume predetermined states or configurations when both noise components $N_A$ and $N_B$ exceed the predetermined level. For example, switch control signal $Z_A$ can assume a high level, and switch control signal $Z_B$ can assume a low level whenever both noise components $N_A$ and $N_B$ are greater than or equal to the predetermined level. In such an instance, diode $D_A$ is made conductive and diode $D_B$ is made nonconductive, so that demodulated signal $S_A'$ is supplied to terminal 4E.

In a further modification of the embodiment shown on FIG. 3, signals $X_A'$ and $X_B'$ from level comparing circuit 50 can be supplied directly to control terminals 4C and 4D, respectively, of switch circuit 4, and output signal $W_C'$ from circuit 60 is used to control voltage comparator 53. In such an instance, when at least one of the levels of noise components $N_A$ and $N_B$ is smaller than the predetermined level, voltage comparator 53 is made operative by output signal $W_C'$ to compare detected voltages $V_{A'}$ and $V_{B'}$. Voltage comparator 53 supplies signals $X_A'$ and $X_B'$ to indicate which of demodulated signals $S_A'$ and $S_B'$ has the lower level noise component. When the levels of both noise components $N_A$ and $N_B$ are greater than or equal to the predetermined level, voltage comparator 53 is made inoperative to perform a voltage comparison in response to output signal $W_C'$ functioning as a stop signal and signals $X_A'$ and $X_B'$ assume predetermined states. For example, signal $X_A'$ may be made to assume a high level while signal $X_B'$ assumes a low level, regardless of the relationship between detected output voltages $V_A'$ and $V_B'$.

Although preferred embodiments of the present invention have been described in detail herein with reference to the accompanying drawings, it is to be understood that the invention is not limited to those embodiments, and that many modifications and variations may be effected therein by one skilled in the art without departing from the spirit or scope of the invention as defined by the appended claims.

What is claimed is:

1. A space diversity receiver for receiving broadcast signals comprising:
   first and second antenna means;
   first and second receiving means coupled to said first and second antenna means, respectively, for supplying first and second output signals in response to said broadcast signals;
   switching means receiving said first and second output signals for selecting and supplying one of said output signals to an output means in response to control signals supplied thereto;
   detecting means for identifying which one of said first and second output signals has a relatively better signal to noise ratio;
   judging means for generating a stop signal when said signal to noise ratios of both of said first and second output signals are less than a predetermined value;
   switch control means connected to said detecting means and judging means for generating said control signals so as to cause said switching means to select and supply the one of said first and second output signals identified at any time by said detecting means in the absence of said stop signal, and to cause said switching means to continuously supply one of said first and second output signals in response to the presence of said stop signal; and
   said output means producing an audio output signal in response to the output signal selected by said switching means.

2. A space diversity receiver according to claim 1; wherein said detecting means includes level comparing circuit means for comparing the levels of said first and second output signals as measures of their relative signal to noise ratios.

3. A space diversity receiver according to claim 2; wherein said judging means comprises level judging circuit means for comparing the levels of said first and second output signals with a predetermined level and for generating said stop signal when said levels of both of said output signals are lower than said predetermined level.

4. A space diversity receiver according to claim 2; wherein said level comparing circuit includes first amplitude detecting means for detecting the level of said first output signal to produce a first voltage corresponding to the detected level, second amplitude detecting means for detecting the level of said second output signal to produce a second voltage corresponding to the detected level, and voltage comparing means for comparing said first and second voltages and producing corresponding indicator signals indicating which of said first and second output signals has the larger level.

5. A space diversity receiver according to claim 4; wherein said judging means includes first additional voltage comparing means for comparing said first voltage with a reference voltage to produce a first compared signal, second additional voltage comparing means for comparing said second voltage with said reference voltage to produce a second compared signal, and logic means responsive to said first and second compared signals to produce said stop signal.

6. A space diversity receiver according to claim 1; wherein each of said first and second output signals includes a noise component; and wherein said detecting means includes level comparing circuit means for comparing the levels of said noise components in said first and second output signals as measures of their relative signal to noise ratio.

7. A space diversity receiver according to claim 6; wherein said judging means includes level judging circuit means for comparing the levels of said noise components with a predetermined level and for generating said stop signal when the levels of said noise components in both of said output signals are larger than said predetermined level.

8. A space diversity receiver according to claim 6; wherein said detecting means includes first high-pass filter means for extracting said noise component from said first output signal, second high-pass filter means for extracting said noise component from said second output signal, first detecting means for detecting the level of said noise component extracted by said first high-pass filter means to produce a first voltage corresponding to said detected level, second detecting means for detecting the level of said noise component extracted by said second high-pass filter means to produce a second voltage corresponding to said detected level, and voltage comparing means for comparing said first and second voltages with each other to produce indicator signals indicating which of said first and second output signals has the smallest noise component.

9. A space diversity receiver according to claim 8; wherein said level judging circuit means comprises first additional voltage comparing means for comparing said first voltage signal with a reference voltage to produce a first compared voltage, second additional voltage comparing means for comparing said second voltage with said reference voltage to produce a second compared voltage, and logic means responsive to first and second compared voltages to produce said stop signal.

10. A space diversity receiver according to claim 9; and further comprising averaging means for receiving said first and second voltages corresponding to said detected levels of said first and second output signals and generating an averaged signal therefrom; and wherein said output means includes filter means responsive to said averaged signal and said stop signal for filtering said output signal supplied by said switching means.

* * * * *